United States Patent [19]

Ma et al.

[11] Patent Number: 5,721,658
[45] Date of Patent: Feb. 24, 1998

[54] INPUT/OUTPUT ELECTROSTATIC DISCHARGE PROTECTION FOR DEVICES WITH MULTIPLE INDIVIDUAL POWER GROUPS

[75] Inventors: Manny K. F. Ma; Jeffrey P. Wright, both of Boise, Id.

[73] Assignee: Micron Technology, Inc., Boise, Id.

[21] Appl. No.: 625,333

[22] Filed: Apr. 1, 1996

[51] Int. Cl.[6] .................................................. H02H 3/22
[52] U.S. Cl. ........................ 361/111; 361/56; 361/91
[58] Field of Search .......................... 361/56, 91, 111; 307/85–86; 257/355, 361–362, 491, 497

[56] References Cited

U.S. PATENT DOCUMENTS

| | | | |
|---|---|---|---|
| 4,945,395 | 7/1990 | Saehiro | 257/203 |
| 5,079,612 | 1/1992 | Takamota et al. | 257/355 |
| 5,293,057 | 3/1994 | Ho et al. | 257/356 |
| 5,568,346 | 10/1996 | Orchard-Webb | 361/58 |

*Primary Examiner*—Jeffrey A. Gaffin
*Assistant Examiner*—Michael Sherry
*Attorney, Agent, or Firm*—Schwegman, Lundberg, Woessner & Kluth, P.A.

[57] ABSTRACT

An electrostatic discharge protection system for an integrated circuit device, such as a solid state memory device or any other integrated circuit device having a plurality of individual power groups, includes a loop of an electrically conductive material that is disposed on the device defining a electrostatic discharge path portion, a plurality of first punch-through devices which connect the input/output pins of different power groups of the integrated circuit device to the power sources of the associated power group, and a plurality of second punch-through devices which connect all of the input/output pins of the integrated circuit device to the electrostatic discharge path portion, thereby providing a discharge path that is common to all of the power groups of the integrated circuit device.

15 Claims, 4 Drawing Sheets

INPUT/OUTPUT ELECTROSTATIC DISCHARGE PROTECTION FOR DEVICES WITH MULTIPLE INDIVIDUAL POWER GROUPS

FIELD OF THE INVENTION

The present invention relates to electrostatic discharge protection arrangements for integrated circuit devices, and more particularly, to an electrostatic discharge protection system and method for protecting integrated circuit devices with multiple individual power groups.

BACKGROUND OF THE INVENTION

It is well known that during handling and/or testing of the integrated circuit devices, electrostatic charges can be applied inadvertently to input/output pins of the device, held temporarily and subsequently discharged through the device, damaging the device. One method for preventing damage to integrated circuit devices from electrostatic discharge events (ESD) is to connect protection devices, such as diodes or "punch-through" devices, between the input/output pins of the integrated circuit device and the power supply circuits of the devices. Such protection devices clamp or limit positive and negative potentials applied to the input and/or output (I/O) pins to the positive and negative supply voltage levels, respectively. However, such arrangements provide protection from high voltage electrostatic discharge only for integrated circuit devices that provide a common power source for all of the circuits on the integrated circuit device.

To minimize the effects of noise in integrated circuit devices, it is common to localize related circuit portions of the integrated circuit device into a plurality of individual power groups, each including a source of operating voltages for circuit portions of the integrated circuit device for that power group. Typically, the individual power groups are not located adjacent one another and the power groups are not electrically interconnected. Therefore, no intentional electrostatic discharge path is provided between the individual I/O pins of different power groups of the circuit device.

If an electrostatic discharge is applied to and held at an input/output pin of an integrated circuit device, such as during insertion into or removal from a test fixture during testing, for example, the static charge must be discharged eternally of the integrated circuit device and the discharge current will take the shortest path and being conducted out through an external input/output pin of the integrated circuit device. If the first pin touched by the input/output pin holding the static charge is not in the same power group, usually the static charge will be discharged over a path that includes circuit portions of the integrated circuit device, causing damage to the integrated circuit device.

For the reasons stated above, and for other reasons stated below which will become apparent to those skilled in the art upon reading and understanding the present specification, there is a need in the art for an electrostatic discharge protection system for integrated circuit devices that include multiple individual power groups.

SUMMARY OF THE INVENTION

The present invention provides an electrostatic discharge protection system for an integrated circuit device having at least first and second individual power groups, each including power supply and at least one input/output pin. The protection system includes a first protection circuit formed on the integrated circuit interposed between the input/output pins and the power supply of the first power group and a second protection circuit formed on the integrated circuit interposed between the input/output pins and the power supply of the second power group. A third protection circuit formed on the integrated circuit includes first and second protection devices each having first and second terminals, with the first terminal of the first protection device being connected to the input/output pin of the first power group and the first terminal of the second protection device being connected to the input/output pin of the second power group. The second terminals of the first and second protection devices are electrically interconnected by electrically conductive material providing a discharge path portion that is common to at least the power source and the input/output pins of the first and second individual power groups. In a preferred embodiment, the electrically conductive material is formed on the integrated circuit device during the fabrication of the device.

Further in accordance with the invention, there is provided a method for providing electrostatic discharge protection for an integrated circuit device having at least first and second power groups having at least one input/output pin. The method comprises forming a plurality of first protection devices on the integrated circuit device which connect at least first and second groups of the input/output pins to the power sources of the first and second power groups, respectively; forming a plurality of second protection devices on the integrated circuit with the second protection devices having terminals connected to all of the input/output pins of the first and second groups; and electrically interconnecting second terminals of the second protection devices to thereby provide a discharge path portion that is common to the power sources and the input/output pins of the first and second groups individual power groups of the integrated circuit device.

DESCRIPTION OF PREFERRED EMBODIMENTS

In the following detailed description of the preferred embodiments, reference is made to the accompanying drawings that form a part hereof, and in which are shown by way of illustration specific embodiments in which the invention may be practiced. It is to be understood that other embodiments may be utilized and structural changes may be made without departing from the scope of the present invention.

Figure 1:
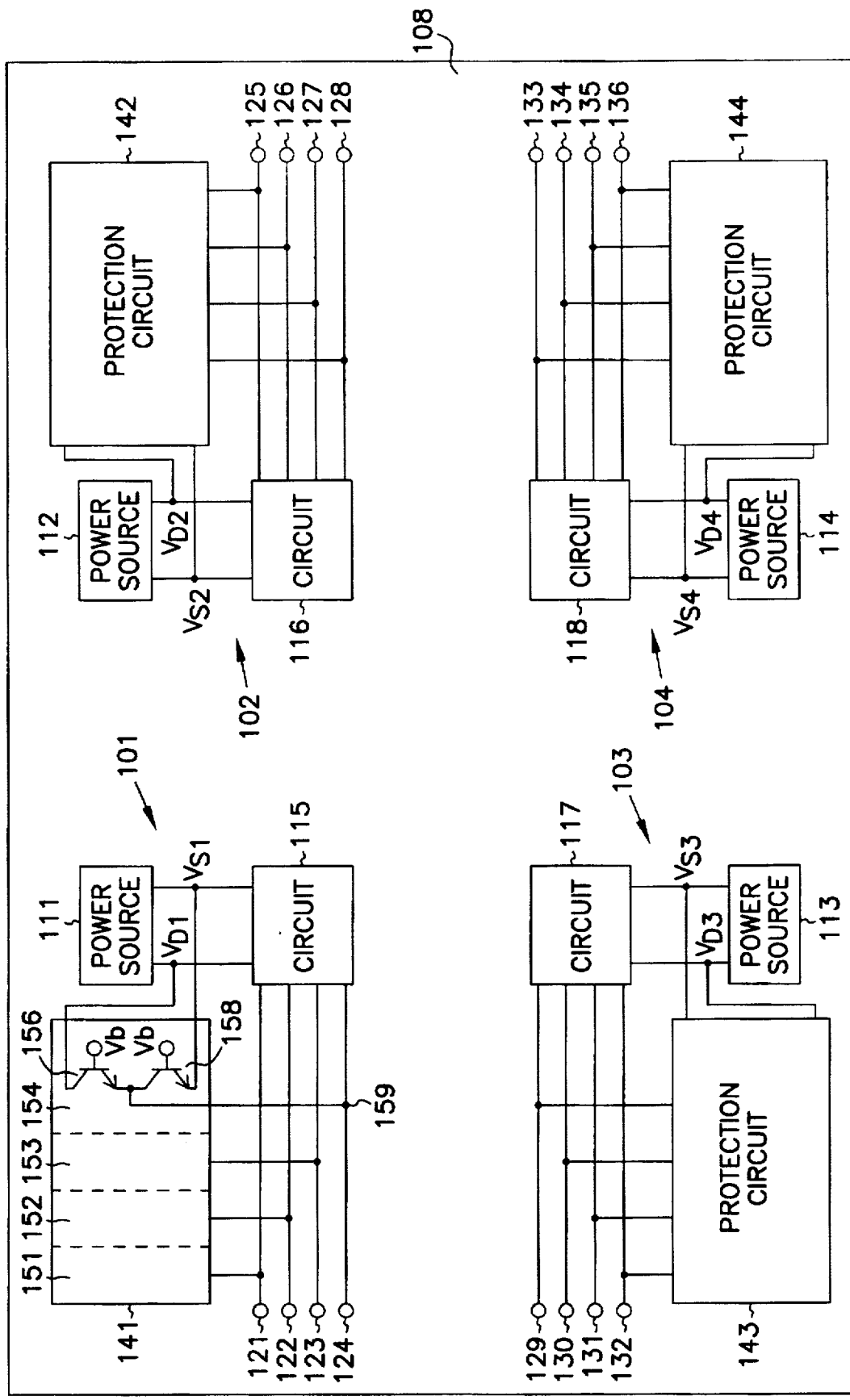
FIG. 1 which is labelled "Prior Art", is a schematic representation of an integrated circuit device including a known protection system for providing electrostatic discharge protection for the integrated circuit device.

Referring to the drawings, FIG. 1, which is labelled "Prior Art", is a schematic representation of an integrated circuit device 100. The integrated circuit device 100 can be a DRAM memory system, an SRAM memory system or any type of circuit device that has multiple drivers. The integrated circuit has four power groups 101–104 which include four power sources 111–114 which are individually associated with circuits 115–118, respectively, which are produced on a die 108 using conventional integrated circuit processing techniques. The integrated circuit device 100 has sixteen input/output pins 121–136 formed on the upper surface of the die 108 and arranged in groups of four pins. Pins 121–124 are in power group 101 and pins 125–128 are in power group 102. Pins 129–132 are in power group 103 and pins 133–136 are in power group 104.

The power groups 101–104 are individual in that the power groups are not located adjacent to one another and are not electrically interconnected. The power source 111 of power group 101 provides voltages $V_{D1}$ and $V_{S1}$ and power source 112 of power group 102 provides voltages $V_{D2}$ and $V_{S2}$. Power source 113 of power group 103 provides voltages $V_{D3}$ and $V_{S3}$ and power source 114 of power group 104 provides voltages $V_{D4}$ and $V_{S4}$. The integrated circuit device includes a conventional electrostatic protection arrangement for protecting the integrated circuit device from electrostatic events. The protection arrangement includes four protection circuits 141–144, including a protection circuit for each power group.

Each protection circuit, such as protection circuit 141, includes four protection devices 151–154, each including a pair of electrostatic discharge punch-through devices 156 and 158, that are interposed between the input/output pins of the integrated circuit device and the power source of the associated power group. The protection devices clamp positive and negative potentials applied to the I/O pins of the integrated circuit device to the supply voltage levels $V_{D1}$ and $V_{S1}$, respectively. Each electrostatic discharge punch-through device is a bipolar NPN transistor in the exemplary embodiment. Transistor 156 has its emitter connected at node 159 to the I/O pin 124 and its collector connected to the source of voltage $V_{D1}$. The base of transistor 156 is connected to a common substrate of the integrated circuit device 100 which is turn is connected to a source of a bias signal $V_b$ which can be ground potential or a D.C. potential. Transistor 158 has its collector connected at node 159 to the I/O pin 124 and its emitter connected to the source of voltage $V_{S1}$. The base of the transistor 158 is connected to the common substrate and thus to bias source $V_b$.

The protection arrangement provides protection against ESD events occurring at the I/O pins of the integrated circuit device 100. However, because the integrated circuit device includes four individual power groups and became there is no reference in common between the power groups, no intentional paths for electrostatic discharge are provided between the power groups. Thus, for example, if an electrostatic discharge is applied to and held at input/output pin 124 of the integrated circuit device 100, such as during removal of the device from a test fixture during post fabrication testing of the integrated circuit device, the static charge must be discharged eternally of the integrated circuit device. Also, the discharge current will take the shortest path and will be conducted out through an external input/output pin of the integrated circuit device. By way of example, it is assumed that during reinsertion of the integrated circuit device into a test fixture that the first pin touched by the input/output pin 124 that is holding the static charge is pin 125, which is not in the same power group. The protection circuit 154 associated with input/output pin 124 is ineffective. Moreover, became there is no reference in common for input/output pins of different power groups, the static charge will be discharged over a path that includes pin 125 and the circuit portions of the integrated circuit device that are connected to pin 125, causing damage to the integrated circuit device.

Figure 2:
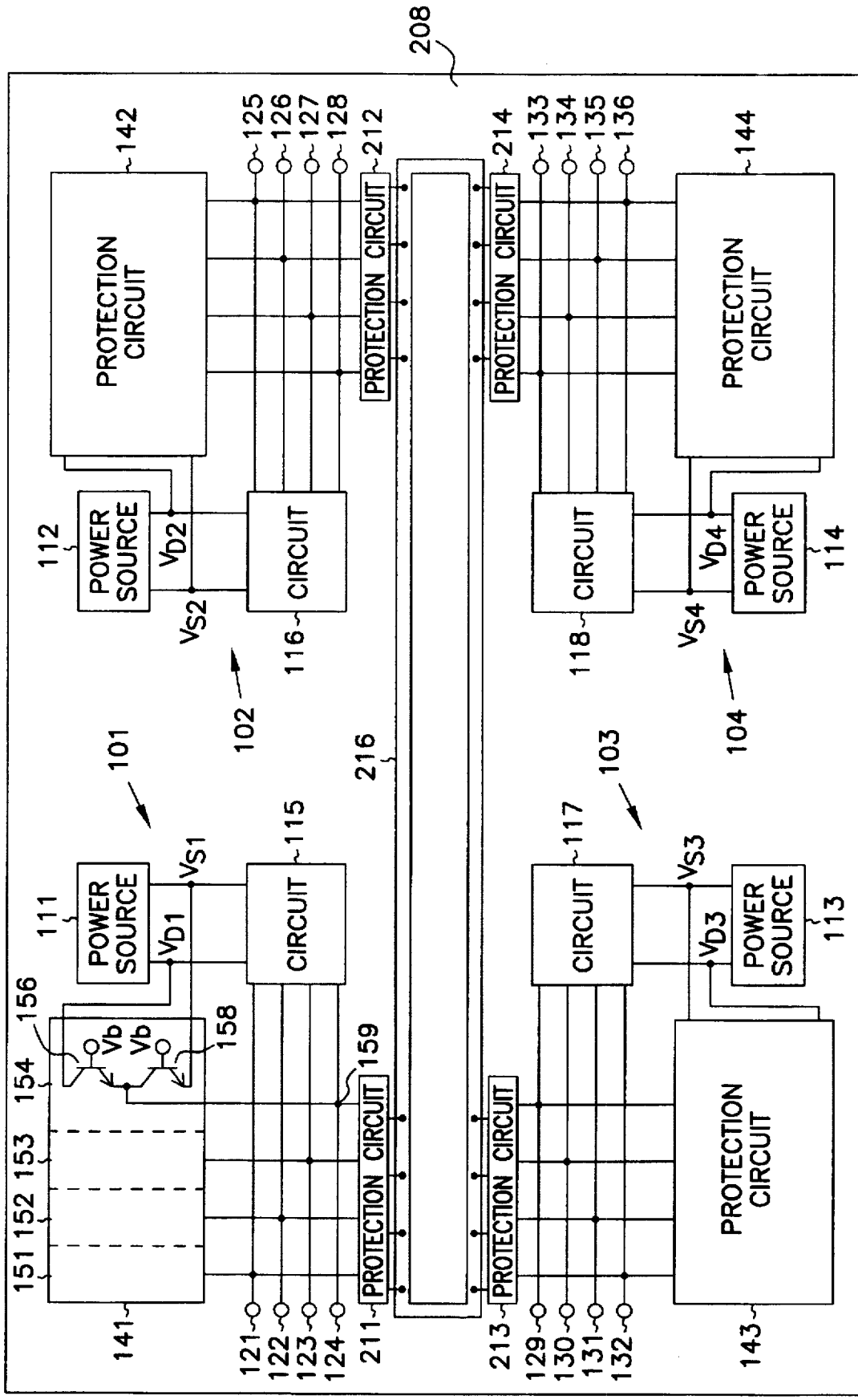
FIG. 2 is a schematic representation of an integrated circuit device having a plurality of individual power groups and which incorporates the electrostatic discharge protection system provided by with the invention.

Referring to FIG. 2, there is illustrated an integrated circuit device 200 having a plurality of power groups and which incorporates the ESD protection system provided by the invention. The integrated circuit device 200 can be a DRAM memory system, an SRAM memory system or any type of circuit device that has multiple drivers. The ESD protection system of the present invention is described with reference to an application in an integrated circuit device such as integrated circuit device 100 shown in FIG. 1, and elements of the integrated circuit device 200 have been given the same reference number as corresponding elements of device 100.

In accordance with the invention, the protection system of the present invention includes protection circuits 141–144. Each protection circuit, such as protection circuit 141, includes four protection devices 151–154, each including a pair of electrostatic discharge punch-through devices 156 and 158, that are interposed between the input/output pins of the integrated circuit device and the power source of the associated power group. The protection devices clamp positive and negative potentials applied to the I/O pins of the integrated circuit device to the supply voltage levels $V_{D1}$ and $V_{S1}$, respectively. Each electrostatic discharge punch-through device is an NPN transistor in the preferred embodiment. However, those skilled in the art will appreciate that the electrostatic discharge punch-through devices can be PNP transistors, breakdown diodes, silicon controlled switches, or any other suitable bipolar device, or field-effect devices, for example.

The protection system of the present invention further includes four protection circuits 211–214 which are interconnected by a closed loop or ring of electrically conductive material 216, forming a closed loop discharge path portion within the integrated circuit device. Each of the four protection circuits 211–214 is individually associated with a different one of the power groups 101–104. Each protection circuit connects the I/O pins of its associated power group to the conductive loop 216 so that a reference is provided that is common to all of the power groups. The conductive loop 216 is independent of the wiring that supplies power to the integrated circuit, and is, thus, unbiased.

Figure 3:
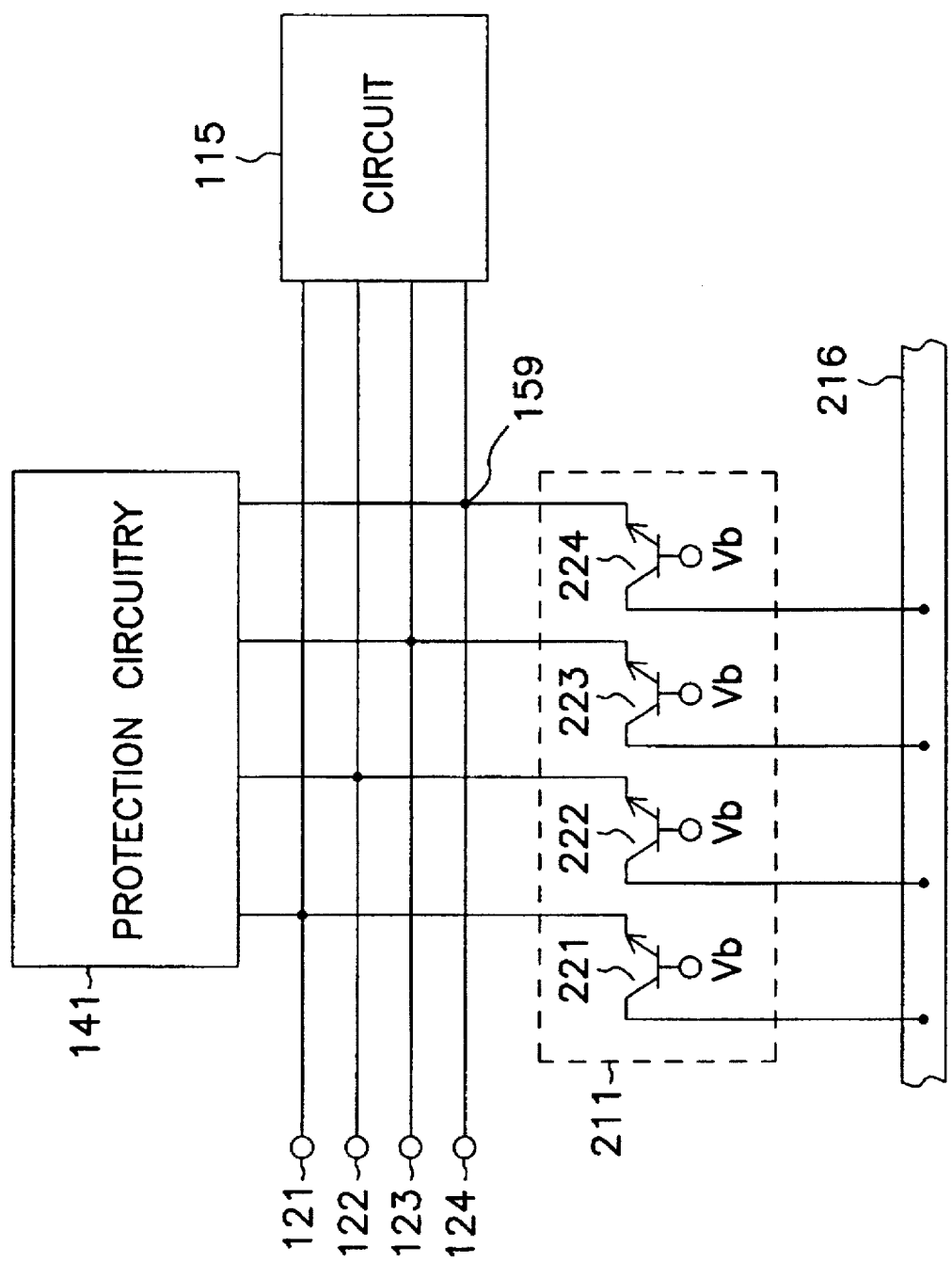
FIG. 3 is a schematic circuit diagram of the protection circuit for the protection system shown in FIG. 2.

More specifically, referring to FIG. 3, each protection circuit 211–214, such as protection circuit 211, includes four punch-through devices 221–224, each individually associated with a different one of the four I/O pins 121–124 of the power group 101. In the exemplary embodiment, each protection device, such as protection device 224, is an electrostatic discharge punch-through device embodied as an NPN transistor having its emitter, which forms one terminal of the device, connected directed at node 159 to I/O pin 124. The collector of the transistor, which forms another terminal of the device, is electrically connected to the conductive loop 216. Such connection is made during fabrication of the integrated circuit device. The base of the transistor is formed on the common substrate which is connected to bias source $V_b$, in common with the bases of the transistors, such as transistors 156 and 158 (FIG. 1) of the protection circuits 141–144. The protection circuits 211–214 are formed on the die 208 during the formation of the protection circuits 141–144 and the other circuits of the integrated circuit device, so that no additional process steps are required to provide the protection circuits 211–214.

Figure 4:
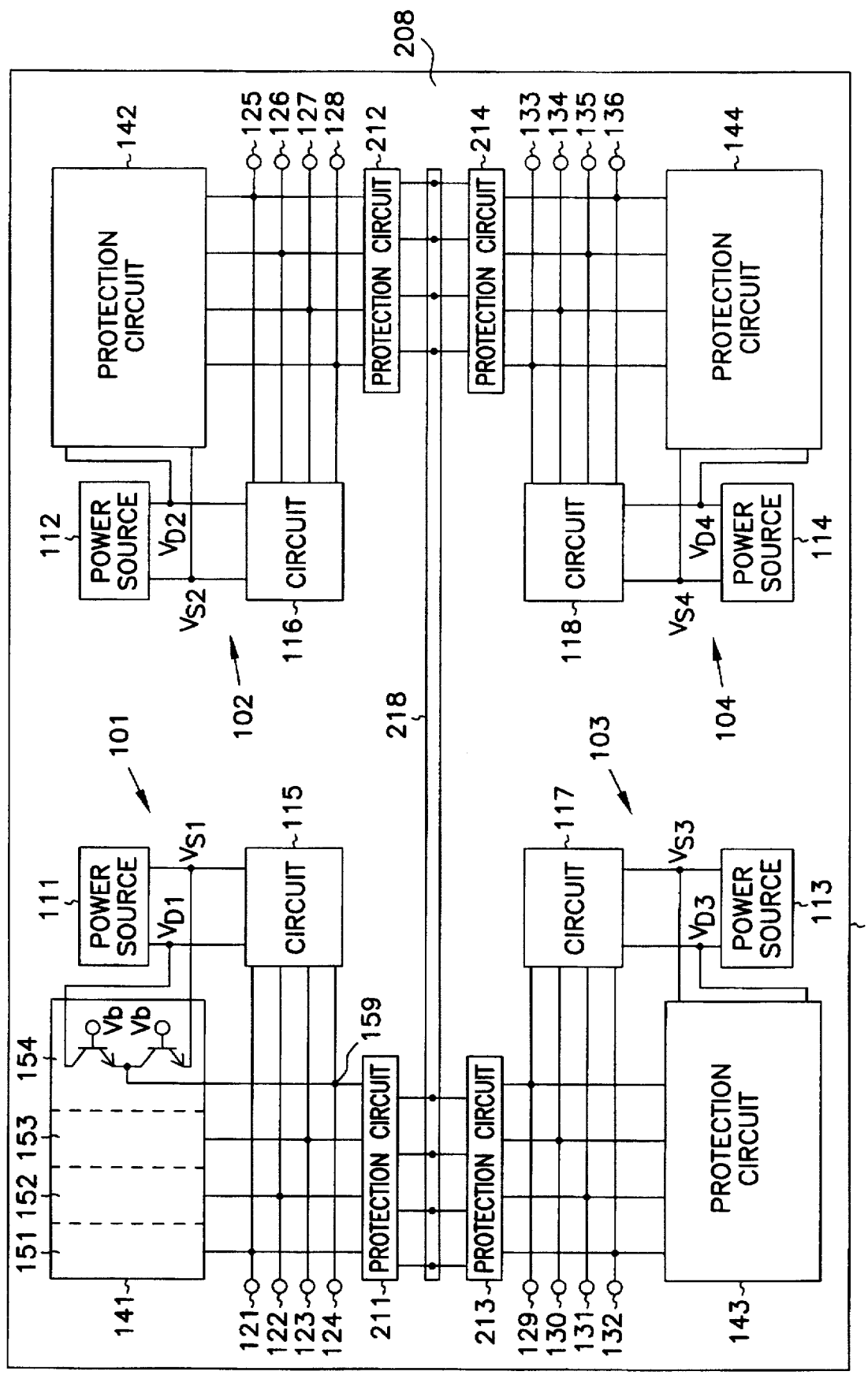
FIG. 4 is a schematic representation of an integrated circuit device incorporating a further embodiment of an electrostatic discharge protection system provided by the invention.

Referring again to FIG. 2, in the preferred embodiment, the conductive loop 216 is made of aluminum, or some other electrically conductive material. The loop of conductive material is formed on the substrate of the integrated circuit device during fabrication of the device and at the time that the metal for the "live" circuits is being deposited on the die 208 so that no additional process steps are required. The location of the loop of conductive material is determined in part by the layout of the conductors of the "live" circuits and is formed so as to minimize the mount of conductive material needed to interconnect all of the protection circuits 211–214. The width and thickness of the conductive material 216 is preferably about the same as the width and thickness as the other metal of the "live" circuit of the integrated circuit device 200. It will be appreciated by those skilled in the art that the conductive material that interconnects the protection circuits 211–214 does not have to be in the form of a closed loop and, for example, can be a straight conductor 218 as illustrated in FIG. 4, or can have some other configuration. Moreover, the collectors of the transistors or the protection circuits 211–214 can be connected to pins or terminals (not shown) formed on the die 208 with such pins or terminals being connected together by a discrete conductive element that is applied to such pins or terminals prior to or after passivation of the integrated circuit device.

For purposes of illustration of the protection system of the present invention, it is assumed that while handling the integrated circuit device 200, such as during testing after fabrication, a static charge is applied inadvertently to and held by I/O pin 124 of power group 101. Subsequently, the integrated circuit device is to be mounted in a test fixture (not shown) having external input/output pins by which power is applied to the power groups 101–104 of the integrated circuit device 200. Under normal conditions, as the integrated circuit device is mounted in the test fixture, the pins of the integrated circuit are aligned so that each of the four pin groups is connected to the proper power groups. Thus, generally, the static charge will be discharged via protection circuit 154 to the source of voltage $V_{D1}$, (or to the source of the voltage $V_{S1}$, depending on the polarity of the voltage), and out of the integrated circuit device through the external input/output pins of the test fixture that connect power to the integrated circuit device.

If on the other hand, the first pin touched by the I/O pin 124 is pin 125, a pin that is in power group 102, for example, the protection device 154 of the associated protection circuit 142 is ineffective because no discharge path can be established to the source of voltage $V_{D1}$ or voltage $V_{S1}$. In such case, the NPN transistor of the protection device 224 of protection circuit 211 will conduct, connecting node the input/output pin 125 to the discharge loop 216, and the discharge current will flow over a discharge path portion that includes pin 125 and protection device 154 of protection circuit 211 to the I/O pin 124 of power group 101, allowing a discharge path to be completed to the external input/output pins of the test fixture. Therefore, the discharge current will be conducted from input/output pin 125 to the external input/output pin that supplies power to power group 101. As has been indicated, in the preferred embodiment, the electrostatic discharge punch-through devices 221–224 of the protection circuits 211–214 is an NPN transistor in the preferred embodiment. However, it is apparent that the electrostatic discharge punch-through devices can be PNP transistors, breakdown diodes, silicon controlled switches, or any other suitable bipolar device, or field-effect devices, for example.

Conclusion

Thus, an electrostatic discharge protection system has been described which provides an electrostatic discharge protection system for an integrated circuit device having a plurality of individual power groups. The protection system includes a plurality of electrostatic discharge punch-through devices which connect the input/output pins of all of the power groups to a common conductive media, providing a electrostatic discharge path portion which is common to all of the power groups. Each electrostatic discharge punch-through device is an NPN transistor in the preferred embodiment. However, those skilled in the art will appreciate that the electrostatic discharge punch-through devices can be PNP transistors, breakdown diodes, silicon controlled switches, or any other suitable bipolar device, or field-effect devices, for example. Moreover, in the preferred embodiment, the common electrostatic discharge path portion is provided by a closed loop of an electrically conductive material that is formed on the integrated circuit device during fabrication of the metal for the "live" circuits. However, it will be appreciated by those skilled in the art that the conductive material that interconnects the protection circuits does not have to be in the form of a closed loop and, for example, can be a straight conductor or can have some other configuration. Further, the terminals of the punch-through devices of the protection circuits can be connected to pins or terminals formed on the die with such pins or terminals being connected together by a discrete conductive element that is applied to such pins or terminals prior to or after passivation of the integrated circuit device.

The electrostatic discharge protection system has been described with reference to a preferred application in an integrated circuit device, such as a DRAM memory system, an SRAM memory system or any type of circuit device that has multiple drivers, but can be employed in numerous applications in many types of integrated circuits. Thus, although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. An electrostatic discharge protection system for an integrated circuit device having at least first and second individual power groups, each of said power groups including a power source and at least one input/output pin, said protection system comprising:

a first protection circuit formed on said integrated circuit device, said first protection circuit being interposed between said input/output pin of said first power group and said power source of said first power group;

a second protection circuit formed on said integrated circuit device, said second protection circuit being interposed between said input/output pin of said second power group and said power source of said second power group;

a third protection circuit formed on said integrated circuit device, said third protection circuit including first and second protection devices each having first and second terminals, said first terminal of said first protection device being connected to said input/output pin of said first power group and said first terminal of said second protection device being connected to said input/output pin of said second power group; and electrically conductive material interconnecting said second terminals of said first and second protection devices to thereby provide an unbiased discharge path portion that is common to said power source and said at least one input/output pin of said at least first and second individual power groups.

2. The electrostatic discharge protection system according to claim 1, wherein each of said protection devices comprises a bipolar electrostatic discharge punch-through device.

3. The electrostatic discharge protection system according to claim 2, wherein each of said bipolar electrostatic discharge punch-through devices is an NPN-transistor.

4. The electrostatic discharge protection system according to claim 1, wherein said electrically conductive material is disposed on said integrated circuit device in a closed loop.

5. The electrostatic discharge protection system according to claim 4, wherein said electrically conductive material is aluminum.

6. The electrostatic discharge protection system according to claim 4, wherein said integrated circuit device includes a substrate, and wherein said electrically conductive material is deposited on said substrate during fabrication of said integrated circuit device.

7. The electrostatic discharge protection system according to claim 1, wherein said integrated circuit device is a solid state memory device.

8. An electrostatic discharge protection system for an integrated circuit device having a plurality of individual power groups each including a power source and a plurality of input/output pins, said protection system comprising:
    electrically conductive material disposed on said integrated circuit device in a closed loop defining an unbiased discharge path portion;
    a first protection circuit including a plurality of first protection devices, different ones of said first protection devices being interposed between different ones of said input/output pins of said integrated circuit device and different ones of said power sources of said power groups;
    a second protection circuit including a plurality of second protection devices, each of said second protection devices individually connecting a different one of said input/output pins to said closed loop whereby said discharge path portion is common to all of said input/output pins and to all of said power sources of said plurality of individual power groups.

9. The electrostatic discharge protection system according to claim 8, wherein each of said protection devices comprises a bipolar electrostatic discharge punch-through device.

10. The electrostatic discharge protection system according to claim 9, wherein each of said bipolar electrostatic discharge punch-through devices is an NPN-transistor.

11. The electrostatic discharge protection system according to claim 10, wherein said integrated circuit device is a solid state memory device.

12. A method for providing electrostatic discharge protection for an integrated circuit device having at least first and second individual power groups, each of said power groups including a power source and at least one input/output pin, said method comprising:
    forming a plurality of first protection devices on said integrated circuit device which connect at least first and second groups of said input/output pins to said power sources of said first and second power groups, respectively; and
    forming a plurality of second protection devices on said integrated circuit device with each of said second protection devices having a first terminal connected to a different one of said input/output pins of said first and second groups; and
    electrically interconnecting second terminals of said second protection devices to thereby provide an unbiased discharge path portion that is common to all of said power sources and all of said input/output pins of said individual power groups of said integrated circuit device.

13. The method according to claim 12, wherein electrically interconnecting said second terminals of said second protection devices includes providing a closed loop of an electrically conductive material which forms said unbiased discharge path portion, and electrically connecting said second terminals of each of said second protection devices to said unbiased discharge path portion.

14. The method according to claim 13, wherein providing said closed loop of an electrically conductive material includes depositing said electrically conductive material on a substrate of said integrated circuit device in a closed loop in an electrically conducting relationship with said second terminals of each of said second protection devices.

15. The method according to claim 12, wherein each of said second protection devices comprises a bipolar electrostatic discharge punch-through device.

* * * * *

UNITED STATES PATENT AND TRADEMARK OFFICE
CERTIFICATE OF CORRECTION

PATENT NO.: 5,721,658
DATED: Feb. 24, 1998
INVENTOR(S) : Ma et al.

It is certified that error appears in the above-identified patent and that said Letters Patent is hereby corrected as shown below:

On the cover page, delete "Appl. No.: 625,333" and insert --Appl. No.: 08/625,333--, therefor.

In column 1, line 46, delete "eternally" and insert --externally--, therefor.

In column 3, line 49, delete "became" and insert --because--, therefor.

In column 3, line 57, delete "eternally" and insert --externally--, therefor.

In column 3, line 66, delete "became" and insert --because--, therefor.

Signed and Sealed this

Twenty-ninth Day of May, 2001

Attest:

NICHOLAS P. GODICI

*Attesting Officer*  *Acting Director of the United States Patent and Trademark Office*